(12) United States Patent
Hu et al.

(10) Patent No.: US 12,406,020 B2
(45) Date of Patent: Sep. 2, 2025

(54) INFORMATION PRESENTATION METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Fuxing Hu, Shenzhen (CN); Guanghua He, Shenzhen (CN); Shijie Zou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 189 days.

(21) Appl. No.: 18/079,191

(22) Filed: Dec. 12, 2022

(65) Prior Publication Data
US 2023/0115491 A1    Apr. 13, 2023

Related U.S. Application Data

(63) Continuation of application No. PCT/CN2021/107228, filed on Jul. 20, 2021.

(30) Foreign Application Priority Data

Sep. 24, 2020  (CN) .......................... 202011013676.6

(51) Int. Cl.
*G06F 16/957*  (2019.01)
*G06F 16/958*  (2019.01)

(52) U.S. Cl.
CPC ........ *G06F 16/9577* (2019.01); *G06F 16/957* (2019.01); *G06F 16/9574* (2019.01); *G06F 16/958* (2019.01)

(58) Field of Classification Search
CPC ............... G06F 16/957; G06F 16/9574; G06F 16/9577; G06F 16/958; G06F 40/14; G06F 3/0482; G06F 3/0485
See application file for complete search history.

(56) References Cited

U.S. PATENT DOCUMENTS 9,830,304 B1 *  11/2017  Simeonov ............. G06F 40/103
2013/0061182 A1 *  3/2013  Weise ................... G06F 16/748
715/853

(Continued)

FOREIGN PATENT DOCUMENTS

CN   103853729 A      6/2014
CN   107193880 A *    9/2017 ......... G06F 16/9574

(Continued)

OTHER PUBLICATIONS

The World Intellectual Property Organization (WIPO) International Search Report for PCT/CN2021/107228 Oct. 18, 2021 6 Pages (including translation).

*Primary Examiner* — Howard Cortes
(74) *Attorney, Agent, or Firm* — ANOVA LAW GROUP PLLC

(57) ABSTRACT

Disclosed are an information presentation method and apparatus, an electronic device, and a storage medium. The information presentation method includes receiving an information presentation request, the information presentation request carrying a resource identifier of an object that needs to be presented and a page identifier during information presentation; displaying an information presentation page corresponding to the page identifier; obtaining a resource dataset of the object that needs to be presented according to the resource identifier, the resource dataset comprising at least two data nodes; identifying a data node that needs to be presented from the at least two data nodes based on page scrolling information and page size informa- (Continued)

tion of the information presentation page; and presenting node information corresponding to the data node that needs to be presented in the information presentation page.

17 Claims, 5 Drawing Sheets

(56) References Cited

U.S. PATENT DOCUMENTS

2015/0082151 A1   3/2015  Liang et al.
2015/0261770 A1   9/2015  Chen et al.
2016/0246473 A1*  8/2016  Jobs ................. H04M 1/72436

FOREIGN PATENT DOCUMENTS

| CN | 110321042 A |   | 10/2019 |
| CN | 110717120 A | * | 1/2020 |
| CN | 111931097 A |   | 11/2020 |

* cited by examiner

INFORMATION PRESENTATION METHOD AND APPARATUS, ELECTRONIC DEVICE, AND STORAGE MEDIUM

RELATED APPLICATIONS

This application is a continuation application of PCT Application No. PCT/CN2021/107228, filed on Jul. 20, 2021, which in turn claims priority to Chinese Patent Application No. 2020110136766, entitled "INFORMATION PRESENTATION METHOD AND APPARATUS, ELECTRONIC DEVICE, AND STORAGE MEDIUM" filed with the China National Intellectual Property Administration on Sep. 24, 2020. The two applications are both incorporated herein by reference in their entirety.

FIELD OF THE TECHNOLOGY

This application relates to the field of computer technologies, and specifically, to an information presentation method and apparatus, an electronic device, and a storage medium.

BACKGROUND OF THE DISCLOSURE

When an application needs to present a large amount of data, a long list generally needs to be rendered. During frequent page turning and data loading, the content of the page is accumulated continuously. When the page is loaded with more content and updated, the process becomes lagging. Especially in a web page, the performance of the application is not as good as that of other clients, and the creation and updating of data nodes are relatively time-consuming. Therefore, after a large number of data nodes are rendered on the page, the loading and updating of the data becomes stuck and the performance is poor.

SUMMARY

An information presentation method and apparatus, an electronic device, and a storage medium are provided according to various embodiments provided by this application.

The embodiments of this application provide an information presentation method, performed by an electronic device. The information presentation method includes receiving an information presentation request, the information presentation request carrying a resource identifier of an object that needs to be presented and a page identifier during information presentation; displaying an information presentation page corresponding to the page identifier; obtaining a resource dataset of the object that needs to be presented according to the resource identifier, the resource dataset comprising at least two data nodes; identifying a data node that needs to be presented from the at least two data nodes based on page scrolling information and page size information of the information presentation page; and presenting node information corresponding to the data node that needs to be presented in the information presentation page.

The embodiments of this application provide an electronic device, including a memory, a processor, and a computer readable instruction stored on the memory and operable on the processor, the processor, when executing the computer readable instruction, implementing steps of the foregoing information presentation method.

The embodiments of this application provide a non-transitory computer readable storage medium, storing a computer readable instruction, the computer readable instruction, when executed by a processor, implementing steps of the foregoing information presentation method.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions of embodiments of this application more clearly, the following briefly describes the accompanying drawings required for describing the embodiments. Apparently, the accompanying drawings in the following description show only some embodiments of this application. Persons of skill in the art may still obtain other accompanying drawings according to these accompanying drawings without creative efforts.

DESCRIPTION OF EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by persons of skill in the art based on the embodiments of this application without creative efforts shall fall within the protection scope of this application.

The embodiments of this application provide an information presentation method and apparatus.

The information presentation apparatus may be specifically integrated in a server or a terminal. The server may be an independent physical server, or may be a server cluster composed of a plurality of physical servers or a distributed system, or may be a cloud server providing a basic cloud computing service, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch and the like, but is not limited thereto. The terminal and the server may be directly or indirectly connected in a wired or wireless communication manner. This is not limited in this application.

Figure 1A:
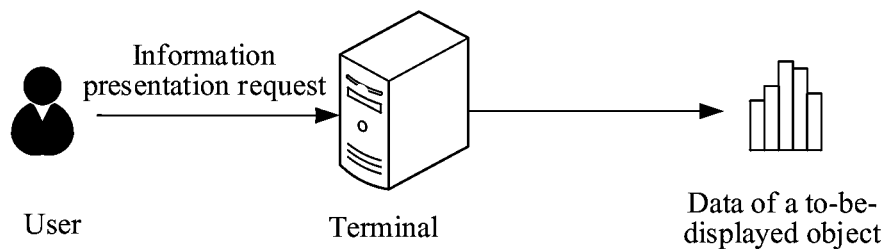
FIG. 1a is a schematic diagram of a scenario of an information presentation method according to an embodiment of this application.

The information presentation apparatus integrated in the terminal is used as an example. Referring to FIG. 1a, when information of data needs to be presented, after the terminal receives an information presentation request that is triggered by a user and that carries a resource identifier of an object that needs to be presented and a page identifier during information presentation, a display screen of the terminal can display an information presentation page corresponding to the page identifier. Then, the terminal obtains a resource dataset of the object that needs to be presented according to the resource identifier, where the resource dataset includes at least two data nodes. Next, the terminal determines a data node that needs to be presented from the at least two data nodes based on page scrolling information and page size information of the information presentation page. Finally, the terminal presents node information corresponding to the data node that needs to be presented in the information presentation page.

The information presentation method provided by this application can calculate the quantity of data nodes that needs to be presented according to the page scrolling information and the page size information of the information presentation page, to avoid loading a data node that does not need to be presented currently during information presentation. Therefore, calculation overheads can be reduced, and the page presentation is smooth, thereby improving a presentation effect during information presentation.

Detailed descriptions are provided below. A description order of the following embodiments is not intended to limit a preferred order of the embodiments.

An information presentation method includes: receiving an information presentation request, displaying an information presentation page corresponding to a page identifier, obtaining a resource dataset of an object that needs to be presented according to a resource identifier, determining a data node that needs to be presented from at least two data nodes based on page scrolling information and page size information of the information presentation page, and presenting node information corresponding to the data node that needs to be presented in the information presentation page.

Figure 1B:
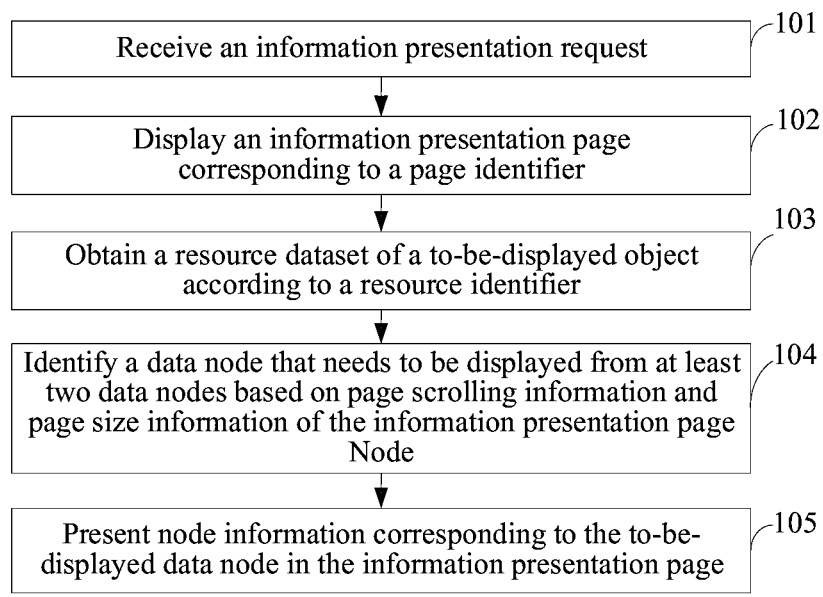
FIG. 1b is a schematic flowchart of an information presentation method according to an embodiment of this application.

Referring to FIG. 1b, FIG. 1b is a schematic flowchart of an information presentation method according to an embodiment of this application. A specific procedure of the information presentation method may be as follows:

101. Receive an information presentation request.

The information presentation request carries a resource identifier of an object that needs to be presented and a page identifier during information presentation. The object that needs to be presented may be profile information of an application program, structure information of a communication network, test information of a test case and the like. Each object that needs to be presented corresponds to a resource identifier, and data corresponding to the object that needs to be presented may be obtained according to the resource identifier. The page identifier indicates a size and a page scrolling distance of the presentation page during presentation.

102. Display an information presentation page corresponding to a page identifier.

The information presentation page may be displayed on a browser according to the page size and the page scrolling distance indicated by the page identifier. The browser may be a Google browser, a Firefox browser, an IE browser and the like. Further, the information presentation page may be provided with a page closing control, and can also display an information presentation time, a name of the object that needs to be presented, and the like. Specific configurations are made according to an actual situation and details are not described herein again.

103. Obtain a resource dataset of the object that needs to be presented according to a resource identifier.

For example, the resource dataset includes at least two data nodes. A data structure is a way that a computer stores and organizes data. The data structure refers to a set of data elements that have one or more specific relationships with each other. In general, a carefully selected data structure can bring higher operation or storage efficiency. The data structure reflects a logical relationship between data elements (also known as data nodes). The logical relationship refers to a sequential relationship between the data elements, regardless of storage locations of the data elements in the computer. The logical structure may include the following:

1. Set: There is no other relationship between elements in the data structure except a relationship of belonging to a same set;
2. Linear structure: There is a one-to-one relationship between elements in the data structure;
3. Tree structure: There is a one-to-many relationship between elements in the data structure.
4. Graphic structure: There is a many-to-many relationship between elements in the data structure.

A physical structure of data is a representation of the data structure in the computer (also known as a mapping), which includes an in-machine representation of data elements and an in-machine representation of a relationship. Because the specific implementation methods include order, link, index, hash and the like, a data structure may be represented as one or more storage structures.

In-machine representation of data elements (mapping method): A data element is represented by a binary bit string. When a data element is composed of several data items, sub bit strings corresponding to the data items in the bit string are called data fields. Therefore, a node is an in-machine representation (or in-machine mapping) of the data element.

In-machine representation of a relationship (mapping method): An in-machine representation of a relationship between data elements may be classified as sequential mapping or non-sequential mapping, and two storage structures are commonly used: a sequential storage structure and a chain storage structure. The sequential mapping represents a logical relationship between data elements by means of relative positions of the elements in a memory. The non-sequential mapping represents a logical relationship between data elements by means of pointers indicating storage locations of the elements.

104. Determine a data node that needs to be presented from at least two data nodes based on page scrolling information and page size information of the information presentation page.

During information presentation, data information of the object that needs to be presented often cannot be fully presented in a page. In some embodiments, a scrollbar may be arranged in the information presentation page. The page scrolling information may include an offset of the scrollbar relative to the information presentation page. The page size information includes a length and a height of the page. For example, specifically, the data node that needs to be presented may be determined from the at least two data nodes according to attribute information of the data nodes during information presentation (such as a presented size or position), the page scrolling information, and the page size information. That is, in some embodiments, the step of determining a data node that needs to be presented from at least two data nodes based on the page scrolling information and the page size information of the information presentation page may specifically include:

(11) obtaining attribute information of each data node; and

(12) determining the data node that needs to be presented from the at least two data nodes based on the page scrolling information and the page size information of the information presentation page and the attribute information.

For example, a quantity of data nodes that can be accommodated in the information presentation page may be calculated according to the page scrolling information and the page size information of the information presentation page and the attribute information, and then the data node that needs to be presented is determined from the at least two data nodes based on the calculated quantity. That is, in some embodiments, the step of determining the data node that needs to be presented from the at least two data nodes based on the page scrolling information and the page size information of the information presentation page and the attribute information may specifically include:

(21) calculating a node quantity of the data nodes during information presentation on the information presentation page according to the page size information of the information presentation page and the attribute information;

(22) extracting, from the page scrolling information of the information presentation page, a page scrolling offset of the information presentation page during information presentation;

(23) selecting a data node corresponding to the page scrolling offset in the at least two data nodes to obtain a target data node; and

(24) determining, with the target data node as a benchmark, the data node that needs to be presented from the at least two data nodes based on the attribute information and the node quantity.

For example, information of the nodes is displayed in a list. It is determined that the height of the information presentation page is 10 and the page scrolling offset is 6 according to the page size information, and then a data node corresponding to the page scrolling offset of 6 is selected in the at least two data nodes to obtain the target data node. Specifically, if the page scrolling offset of 0 corresponds to the first data node, the page scrolling offset of 6 corresponds to the seventh data node. That is, the target data node is the seventh data node. Then, with the seventh data node as a benchmark, the data node that needs to be presented is determined from the at least two data nodes based on the attribute information and the node quantity. In some embodiments, with the seventh data node as a benchmark, the data node that needs to be presented may be determined from the at least two data nodes based on the size information and the node quantity of the data nodes during information presentation. That is, the step of determining, with the target data node as a benchmark, the data node that needs to be presented from the at least two data nodes based on the attribute information and the node quantity may specifically include:

(31) extracting, from the attribute information, node reference information of the data nodes and presentation information of the data nodes during information presentation; and

(32) determining, with the target data node as the benchmark, the data node that needs to be presented from the at least two data nodes based on the node quantity, a presentation size and a presentation state.

The presentation information includes the presentation size and the presentation state corresponding to the data node during information presentation. The presentation state refers to an information presentation state of the data node during presentation, such as an unfolded state or a folded state. In some embodiments, in order to facilitate the arrangement of the data nodes during presentation and reduce the calculation amount, the presentation sizes corresponding to all the data nodes may be set to the same size. For example, the size of the data node during presentation is set to 2*2, or other sizes. Specific configurations are made according to the actual situation and details are not described herein again.

For a dataset with a tree structure, in order to facilitate the calculation of the quantity of nodes to be presented, the data nodes that needs to be presented are determined from the at least two data nodes based on the page scrolling information and the page size information of the information presentation page, and the data structure corresponding to the resource dataset can also be detected. In response to detecting that the data structure corresponding to the resource dataset is the tree structure, the data structure corresponding to the resource dataset is flattened.

A core idea of a flattening concept is removing redundant, heavy and complex decorative effects. The flattening may be specifically as follows. First, data in the tree structure is converted into a sequential list to obtain an original list. Then, a reference relationship of child nodes of the original attribute structure is retained, and a reference of a parent node is added. Next, a hierarchical attribute of each data node is recorded, to control a hierarchical indentation of the node during rendering. For example, an indentation of a data node belonging to the first level is 2, and an indentation of a data node belonging to the second level is 5. There is no specific limitation. After that, a hidden attribute of each data node is added to control expanding or collapsing of the information of the data node during presentation. Finally, a rendering height of each data node during rendering (that is, presentation) is set. Hence, flattening of the data structure is completed.

105. Present node information corresponding to the data node that needs to be presented in the information presentation page.

In this embodiment, the information of the data node that needs to be presented may be presented through a visual node information list. In order to facilitate information indexing, in some embodiments, the data nodes that needs to be presented may be sorted, and a corresponding list may be generated based on the sorted data nodes. Finally, the generated node information list is presented in the information presentation page. That is, in some embodiments, the step of presenting node information corresponding to the data node that needs to be presented in the information presentation page may specifically include:

(41) sorting the data nodes that needs to be presented according to an association relationship between the data nodes that needs to be presented; and

(42) generating an information list for the node that needs to be presented based on the sorted data nodes, and presenting the generated node information list in the information presentation page.

The node information list includes at least one of a node information collapsing control and a node information expanding control, which may specifically include three cases;

Case 1: All the presented data nodes are in the unfolded state, and each presented data node corresponds to a node information collapsing control. When a node information collapsing operation triggered for any node information collapsing control is detected, a data node corresponding to the information collapsing operation is determined as a first target node, and then, node information of the first target node is folded. That is, node information of a child node under the presented first target node is hidden. Because the data node at each level may have a different presentation size, the quantity of nodes that can be accommodated in the current page needs to be recalculated. Then, with the first target node as a benchmark, a selected data node is determined from the at least two data nodes based on the recalculated node quantity. A specific selection method is similar to the foregoing embodiment, and details are not described herein again. Finally, the node information list is updated according to the selected data node. That is, in some embodiments, the method may further specifically include:

(51) determining, in response to detecting an information collapsing operation triggered for the node information collapsing control, a data node corresponding to the information collapsing operation as a first target node;

(52) hiding the node information corresponding to the first target node, and calculating a node quantity corresponding to the information presentation page after the information collapsing operation is performed;

(53) determining a selected data node from the at least two data nodes based on the first target node and the node quantity corresponding to the information presentation page after the information collapsing operation is performed; and

(54) updating the node information list of the information presentation page according to the selected data node.

Case 2: All the presented data nodes are in the folded state. That is, each presented data node corresponds to a node information expanding control. When a node information expanding operation triggered for any node information expanding control is detected, a data node corresponding to the information expanding operation is determined as a second target node, and a child node under the data node of the triggered node information expanding operation is presented. The same as case 1, the node quantity needs to be recalculated. Then, with the second target node as a benchmark, a selected data node is determined from the at least two data nodes based on the recalculated node quantity. Finally, the node information list of the information presentation page is updated according to the selected data node. That is, in some embodiments, the method may further specifically include:

(61) determining, in response to detecting an information expanding operation triggered for the node information expanding control, a data node corresponding to the information expanding operation as a second target node;

(62) expanding node information corresponding to the second target node and calculating a node quantity corresponding to the information presentation page after the information expanding operation is performed;

(63) determining a selected data node from the at least two data nodes based on the second target node and the node quantity corresponding to the information presentation page after the information expanding operation is performed; and

(64) updating the node information list of the information presentation page according to the selected data node.

Case 3: Among the presented data nodes, some data nodes are in an information unfolded state, and other data nodes are in an information folded state. The foregoing case 1 and case 2 may be referred to for the specific method, and details are not described herein again.

An information presentation solution is actually a dynamic planning solution. During implementation, information of corresponding data nodes is presented according to an actual situation. In this application, the quantity of data nodes that needs to be presented is calculated according to the page scrolling information and the page size information of the information presentation page, to avoid loading a data node that does not need to be presented currently during information presentation. Therefore, calculation overheads can be reduced, and page presentation is smooth, thereby improving a presentation effect during information presentation.

According to the method described in the embodiments, the following further provides a detailed description by using an example.

In this embodiment, a description is made by using an example in which the information presentation apparatus is specifically integrated in a terminal.

Figure 2A:
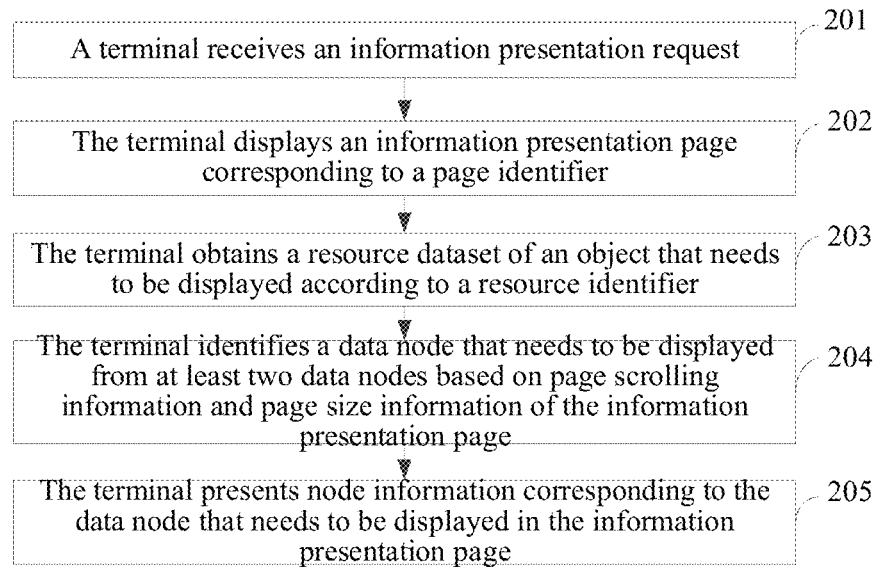
FIG. 2a is another schematic flowchart of an information presentation method according to an embodiment of this application.

Referring to FIG. 2a, a specific procedure of an information presentation method may be as follows:

201. A terminal receives an information presentation request.

The information presentation request carries a resource identifier of an object that needs to be presented and a page identifier during information presentation. The object that needs to be presented may be profile information of an application program, structure information of a communication network, test information of a test case and the like. Each object that needs to be presented corresponds to a resource identifier, and data corresponding to the object that needs to be presented may be obtained according to the resource identifier. The page identifier indicates a size and a page scrolling distance of a presentation page during presentation. Specifically, the terminal can receive the information presentation request triggered by a user clicking an "information presentation" control with a mouse of the terminal.

202. The terminal displays an information presentation page corresponding to the page identifier.

For example, specifically, a browser of the terminal can display the information presentation page corresponding to the page identifier. The browser may be a Google browser, a Firefox browser, an IE browser and the like.

203. The terminal obtains a resource dataset of the object that needs to be presented according to the resource identifier.

204. The terminal identifies a data node that needs to be presented from at least two data nodes based on page scrolling information and page size information of the information presentation page.

During information presentation, data information of the object that needs to be presented often cannot be fully presented in a page. The terminal may arrange a scrollbar in the information presentation page. The page scrolling information may include an offset of the scrollbar relative to the information presentation page. The page size information includes a length and a height of the page. Specifically, the terminal can obtain attribute information of each data node. Then, according to the page size information of the information presentation page and the attribute information, the terminal calculates a node quantity of the data nodes during information presentation on the information presentation page. Next, the terminal extracts, from the page scrolling information of the information presentation page, the page scrolling offset of the information presentation page during information presentation. After that, the terminal selects a data node corresponding to the page scrolling offset in the at least two data nodes to obtain a target data node. Finally, with the target data node as a benchmark, the terminal determines a data node that needs to be presented from the at least two data nodes based on the attribute information and the node quantity.

205. The terminal presents node information corresponding to the data node that needs to be presented in the information presentation page.

Specifically, the terminal can sort the data nodes that needs to be presented according to an association relationship between the data nodes that needs to be presented. Then, the terminal can generate an information list for the node that needs to be presented based on the sorted data nodes, and present the generated node information list in the information presentation page.

Figure 2B:
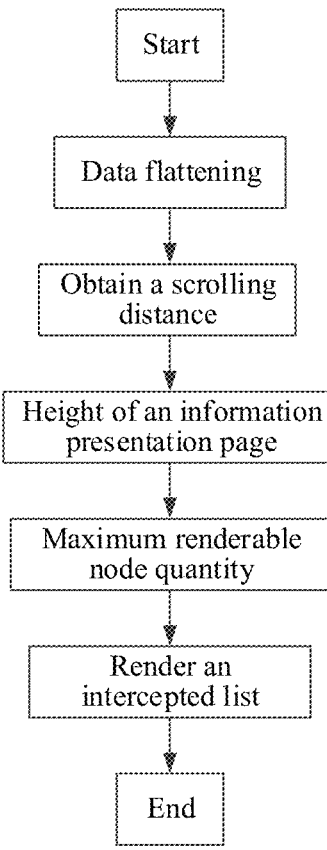
FIG. 2b is still another schematic flowchart of an information presentation method according to an embodiment of this application.
Figure 2C:
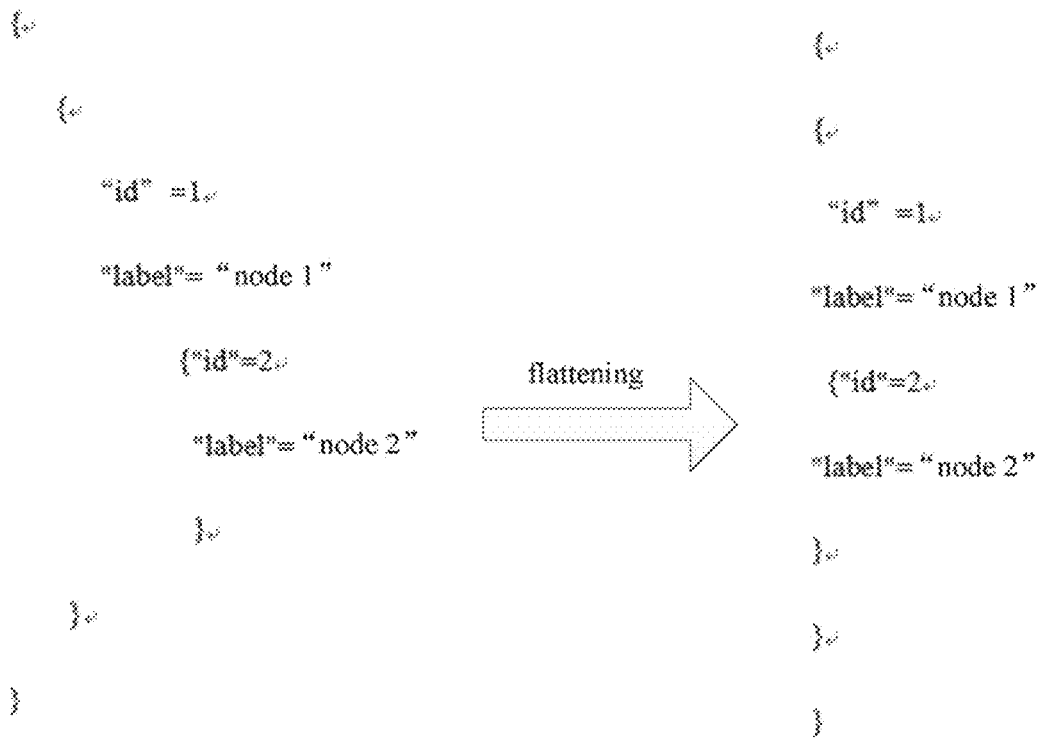
FIG. 2c is a schematic diagram of flattening a data structure in an information presentation method according to an embodiment of this application.

To facilitate further understanding of the information presentation solution of this application, referring to FIG. 2b, data of a tree structure is used as an example. First, the data in the tree structure is converted into a sequential list to obtain an original list. Then, a reference relationship of child nodes of the original attribute structure is retained, and a reference of a parent node is added. Next, a hierarchical attribute of each data node is recorded, to control a hierarchical indentation of the node during rendering. After that, a hidden attribute of each data node is added to control expanding or collapsing of the information of the data node during presentation. Finally, a rendering height of each data node during rendering (that is, presentation) is set. As shown in FIG. 2c, hence, flattening of the data structure is completed.

Figure 2D:
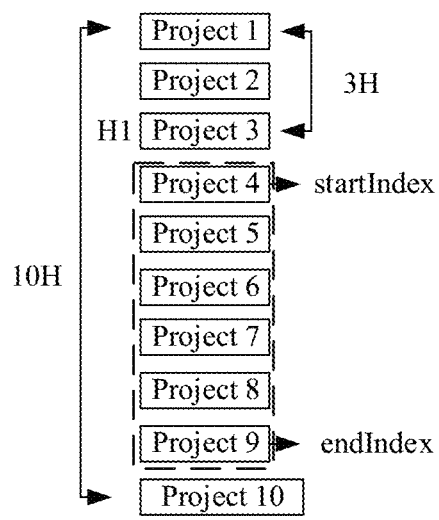
FIG. 2d is a schematic diagram of intercepting list data to be rendered in an information presentation method according to an embodiment of this application.

After the flattening of the data structure is completed, the height of the information presentation page (viewHeight), the presentation height of the data node (H), and the current scrolling distance (scrollTop) may be obtained. A scrollTop event is configured to be triggered when a position of a document is moved in a browser window, for example, moving a stable position with an arrow key, page up and down, or a space bar of a keyboard, or scrolling the stable position with the scrollbar. This event can be used to track a change of the document position and adjust a display position of some elements in time, to ensure that the document or element is constantly presented in a visible area of a screen. Then, a maximum number of renderable nodes (count=viewHeight/H) can be calculated. Afterwards, the target data node (startIndex=scrollTop/H) is determined based on the scrollTop. During rendering of the data nodes, a method of rounding down is adopted. For example, the height of the information presentation page (viewHeight) is 90 and the presentation height of the data node (H) is 7. In this case, by adopting the method of rounding down, the maximum number of renderable nodes (count) is 7. Finally, list data to be rendered is intercepted from the original list and presented in the form of a sequential list. Referring to FIG. 2d, the heights of project 1 to project 10 are H1, a distance between adjacent projects is h, and the sum of the heights from project 1 to project 10 is 10H. The maximum number of renderable nodes (that is, the number of projects) is calculated to be 6. The current scrolling distance is 3H. It is determined that the first project (startIndex) currently rendered is project 4, and the last project (endIndex) is project 9. Finally, project 4 to project 9 are presented in the form of a sequential list.

When a scrolling event is triggered, a 500 ms throttling control is used to avoid producing a large amount of calculation due to scrolling, and the maximum number of renderable nodes (count) is recalculated. The steps are as in the above embodiment.

It can be seen from the above that after a terminal of this embodiment receives an information presentation request, the terminal displays an information presentation page corresponding to a page identifier. Then, the terminal obtains a resource dataset of an object that needs to be presented according to a resource identifier. Next, the terminal determines a data node that needs to be presented from at least two data nodes based on page scrolling information and page size information of the information presentation page. Finally, the terminal presents node information corresponding to the data node that needs to be presented in the information presentation page. The terminal provided by this application can calculate the quantity of data nodes that needs to be presented according to the page scrolling information and the page size information of the information presentation page, to avoid loading a data node that does not need to be presented currently during information presentation. Therefore, calculation overheads can be reduced, and page presentation is smooth, thereby improving a presentation effect during information presentation.

To facilitate better implementation of the information presentation method of the embodiments of this application, an embodiment of this application further provides an information presentation apparatus (presentation apparatus for short) based on the above information presentation method. Meanings of the nouns in this embodiment are the same as those in the above information presentation method. Description in the method embodiments may be referred to for specific implementation details.

Figure 3A:
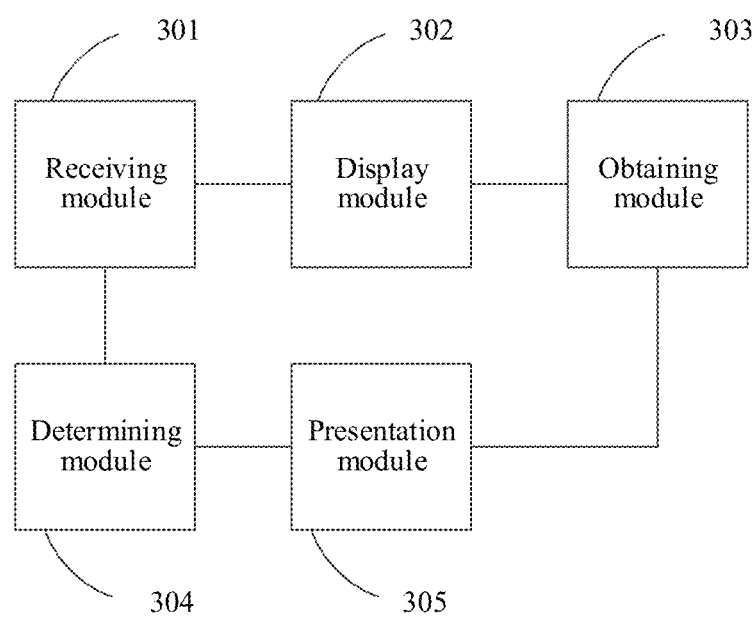
FIG. 3a is a schematic structural diagram of an information presentation apparatus according to an embodiment of this application.

Referring to FIG. 3a, FIG. 3a is a schematic structural diagram of an information presentation apparatus according to an embodiment of this application. The information presentation apparatus may include: a receiving module 301, a display module 302, an obtaining module 303, a determining module 304 and a presentation module 305. The details may be as follows.

The receiving module 301 is configured to receive an information presentation request.

The information presentation request carries a resource identifier of dan object that needs to be presented and a page identifier during information presentation. The object that needs to be presented may be profile information of an application program, structure information of a communication network, test information of a test case and the like. Each object that needs to be presented corresponds to a resource identifier, and data corresponding to the object that needs to be presented may be obtained according to the resource identifier. The page identifier indicates a size and a page scrolling distance of a presentation page during presentation. Specifically, the receiving module 301 can receive the information presentation request triggered by a user clicking an "information presentation" control with a mouse of a terminal.

The display module 302 is configured to display an information presentation page corresponding to the page identifier.

For example, specifically, a browser of the display module 302 can display the information presentation page corresponding to the page identifier. The browser may be a Google browser, a Firefox browser, an IE browser and the like.

The obtaining module 303 is configured to obtain a resource dataset of the object that needs to be presented according to the resource identifier.

The determining module 304 is configured to determine a data node that needs to be presented from at least two data nodes based on page scrolling information and page size information of the information presentation page.

Specifically, the determining module 304 can obtain attribute information of each data node. Then, the determining module 304 calculates a node quantity of the data nodes during information presentation on the information presentation page according to the page size information of the information presentation page and the attribute information. Next, the determining module 304 extracts, from the page scrolling information of the information presentation page, a page scrolling offset of the information presentation page during information presentation. After that, the determining module 304 selects a data node corresponding to the page scrolling offset in the at least two data nodes to obtain a target data node. Finally, with the target data node as a benchmark, the determining module 304 determines the data node that needs to be presented from the at least two data nodes based on the attribute information and the node quantity.

In some embodiments, the determining module 304 may specifically include:
- an obtaining unit, configured to obtain attribute information of each data node; and
- a determining unit, configured to determine the data node that needs to be presented from the at least two data nodes based on the page scrolling information and the page size information of the information presentation page and the attribute information.

In some embodiments, the determining unit may specifically include:
- a calculating subunit, configured to calculate a node quantity of the data nodes during information presentation on the information presentation page according to the page size information of the information presentation page and the attribute information;
- an extracting subunit, configured to extract, from the page scrolling information of the information presentation page, a page scrolling offset of the information presentation page during information presentation;
- a selecting subunit, configured to select a data node corresponding to the page scrolling offset in the at least two data nodes to obtain a target data node; and
- a determining subunit, configured to determine, with the target data node as a benchmark, the data node that needs to be presented from the at least two data nodes based on the attribute information and the node quantity.

In some embodiments, the determining subunit may be specifically configured to: extract, from the attribute information, node reference information of the data nodes and presentation information of the data nodes during information presentation, where the presentation information includes a presentation size and a presentation state corresponding to the data node during information presentation; and determine, with the target data node as the benchmark, the data node that needs to be presented from the at least two data nodes based on the node quantity, the presentation size and the presentation state.

Figure 3B:
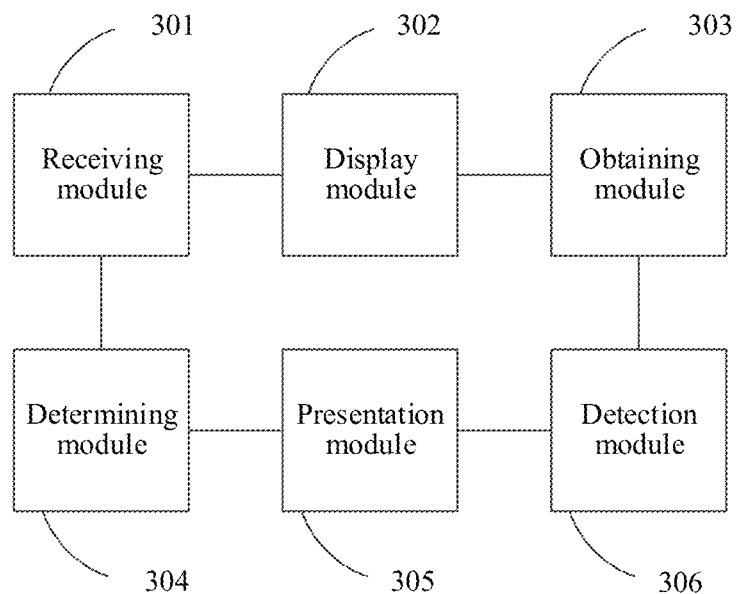
FIG. 3b is another schematic structural diagram of an information presentation apparatus according to an embodiment of this application.

In some embodiments, referring to FIG. 3b, the presentation apparatus may further specifically include a detection module 306. The detection module 306 may be specifically configured to: detect a data structure corresponding to the resource dataset, and in response to detecting that the data structure corresponding to the resource dataset is a tree structure, flatten the data structure corresponding to the resource dataset.

The presentation module 305 is configured to present node information corresponding to the data node that needs to be presented in the information presentation page.

The presentation module 305 can sort the data nodes that needs to be presented according to an association relationship between the data nodes that needs to be presented. Then, the presentation module 305 can generate information list for the node that needs to be presented based on the sorted data nodes, and present the generated node information list in the information presentation page.

In some embodiments, the presentation module 305 may be specifically configured to: sort the data nodes that needs to be presented according to the association relationship between the data nodes that needs to be presented; and generate the information list for the node that needs to be presented based on the sorted data nodes, and present the generated node information list in the information presentation page. The node information list includes at least one of a node information collapsing control and a node information expanding control.

In some embodiments, the presentation module 305 may further be specifically configured to: in response to detecting an information collapsing operation triggered for the node information collapsing control, determine a data node corresponding to the information collapsing operation as a first target node; hide node information corresponding to the first target node, and calculate a node quantity corresponding to the information presentation page after the information collapsing operation is performed; determine a selected data node from the at least two data nodes based on the first target node and the node quantity corresponding to the information presentation page after the information collapsing operation is performed; and update the node information list of the information presentation page according to the selected data node.

In some embodiments, the presentation module 305 may further be specifically configured to: in response to detecting an information expanding operation triggered for the node information expanding control, determine a data node corresponding to the information expanding operation as a second target node; unfold node information corresponding to the second target node, and calculate a node quantity corresponding to the information presentation page after the information expanding operation is performed; determine a selected data node from the at least two data nodes based on the second target node and the node quantity corresponding to the information presentation page after the information expanding operation is performed; and update the node information list of the information presentation page according to the selected data node.

After the receiving module 301 of the information presentation apparatus of this embodiment receives an information presentation request, the display module 302 displays an information presentation page corresponding to a page identifier. Then, the obtaining module 303 obtains a resource dataset of an object that needs to be presented according to a resource identifier. Next, the determining module 304 determines a data node that needs to be presented from at least two data nodes based on page scrolling information and page size information of the information presentation page. Finally, the presentation module 305 presents node information corresponding to the data node that needs to be presented in the information presentation page. The information presentation apparatus provided by this application can calculate the quantity of data nodes that needs to be presented according to the page scrolling information and the page size information of the information presentation page, to avoid loading a data node that does not need to be presented currently during information presentation. Therefore, calculation overheads can be reduced, and page presentation is smooth, thereby improving a presentation effect during information presentation.

Figure 4:
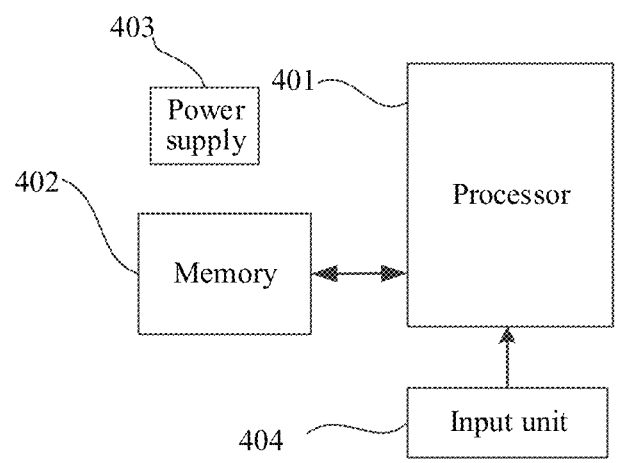
FIG. 4 is a schematic structural diagram of a terminal according to an embodiment of this application.

In addition, this application further provides an electronic device. As shown in FIG. 4, FIG. 4 is a schematic structural diagram of an electronic device according to this application. Specifically:

The electronic device may include components such as a processor 401 with one or more processing cores, a memory 402 with one or more computer readable storage media, a power supply 403, and an input unit 404. A person skilled in the art may understand that the electronic device structure shown in FIG. 4 does not constitute a limitation to the electronic device. The electronic device may include more or fewer components than those shown in the figure, or some components may be combined, or a different component deployment may be used.

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. In some embodiments, the processor 401 may include one or more processing cores. Preferably, the processor 401 may integrate an application processor and a modem processor. The application processor mainly processes an operating system, a user interface, an application program, and the like. The modem processor mainly processes wireless communication. It may be understood that the foregoing modem processor may alternatively not be integrated in the processor 401.

The memory 402 may be configured to store a software program and a module. The processor 401 runs the software program and the module that are stored in the memory 402, to implement various functional applications and data processing. The memory 402 may mainly include a program storage area and a data storage area. The program storage area may store an operating system, an application program required by at least one function (such as a sound playback function and an image display function), and the like. The data storage area may store data created according to use of the electronic device. In addition, the memory 402 may include a high-speed random access memory, and may further include a nonvolatile memory, such as at least one magnetic disk storage device, a flash memory, or another volatile solid-state storage device. Correspondingly, the memory 402 may further include a memory controller, so that the processor 401 can access the memory 402.

The electronic device further includes the power supply 403 for supplying power to the components. Preferably, the power supply 403 may be logically connected to the processor 401 by using a power management system, thereby implementing functions such as charging, discharging, and power consumption management by using the power management system. The power supply 403 may further include one or more direct current or alternating current power supplies, a re-charging system, a power failure detection circuit, a power supply converter or inverter, a power supply state indicator, and any other components.

The electronic device may further include the input unit 404. The input unit 404 may be configured to receive inputted digit or character information and generate a keyboard, mouse, joystick, optical, or trackball signal input related to user setting and function control.

Although not shown in the figure, the electronic device may further include a displaying unit and the like. Details are not described herein again. Specifically, in this embodiment, the processor 401 in the electronic device may load executable files corresponding to processes of one or more application programs to the memory 402 according to the following instructions, and the processor 401 runs the application program stored in the memory 402, to implement various functions as follows:

receiving an information presentation request; displaying an information presentation page corresponding to a page identifier; obtaining a resource dataset of an object that needs to be presented is obtained according to a resource identifier; determining a data node that needs to be presented from at least two data nodes based on page scrolling information and page size information of the information presentation page; and presenting node information corresponding to the data node that needs to be presented in the information presentation page.

For specific implementation of the foregoing operations, reference may be made to the previous embodiments, and details are not described herein again.

In this embodiment, after an information presentation request is received, an information presentation page corresponding to a page identifier is displayed. Then, a resource dataset of an object that needs to be presented is obtained according to a resource identifier. Next, a data node that needs to be presented is determined from at least two data nodes based on page scrolling information and page size information of the information presentation page. Finally, node information corresponding to the data node that needs to be presented is presented in the information presentation page. The information presentation method provided by this application can calculate the quantity of data nodes that needs to be presented according to the page scrolling information and the page size information of the information presentation page, to avoid loading a data node that does not need to be presented currently during information presentation. Therefore, a calculation cost can be reduced, and page presentation is smooth, thereby improving a presentation effect during information presentation.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person of ordinary skill in the art may understand that all or some steps of various methods in the foregoing embodiments may be implemented through instructions, or implemented through the instructions controlling relevant hardware, where the instructions may be stored in a computer readable storage medium and loaded and executed by a processor.

To this end, this application provides a computer readable storage medium, storing a plurality of computer readable instructions, where the computer readable instructions can be loaded by a processor, to perform the steps in any information presentation method provided by this application. For example, the computer readable instructions may perform the following steps.

receiving an information presentation request; displaying an information presentation page corresponding to a page identifier; obtaining a resource dataset of an object that needs to be presented is obtained according to a resource identifier; determining a data node that needs to be presented from at least two data nodes based on page scrolling information and page size information of the information presentation page; and presenting node information corresponding to the data node that needs to be presented in the information presentation page.

For specific implementation of the foregoing operations, reference may be made to the previous embodiments, and details are not described herein again.

The storage medium may include: a read only memory (ROM), a random access memory (RAM), a magnetic disk, an optical disc or the like.

Because the instructions stored in the storage medium can perform the steps of any information presentation method provided by this application, the instructions can achieve beneficial effects that may be achieved by any information presentation method provided by this application. For details, reference may be made to the foregoing embodiments. Details are not described herein again.

According to an aspect of this application, a computer program product or a computer program is provided, where the computer program product or the computer program includes computer instructions, the computer instructions being stored in a computer readable storage medium. A processor of a computer device reads the computer instructions from the computer readable storage medium, and executes the computer instructions, to cause the computer device to perform the methods provided by the various optional implementations above.

An information presentation method and apparatus, an electronic device, and a storage medium provided by this application are described in detail above. The principle and implementations of the present invention are described herein by using specific examples. The descriptions of the foregoing embodiments are merely used for helping understand the method and the core idea of the present invention. Meanwhile, a person skilled in the art may make modifications in terms of the specific implementations and application scopes according to the idea of the present invention. In conclusion, the content of this specification should not be understood as a limitation to the present invention.

What is claimed is:

1. An information presentation method, performed by an electronic device, comprising:

receiving an information presentation request, the information presentation request carrying a resource identifier of an object to be presented and a page identifier during information presentation;

displaying an information presentation page corresponding to the page identifier;

obtaining a resource dataset of the object to be presented according to the resource identifier, the resource dataset comprising at least two data nodes and having a tree structure;

flattening the resource dataset with the tree structure to obtain a sequential list and attribute information of each data node in the resource dataset, the attribute information of a data node comprising: a reference relationship attribute indicating a parent data node, a hierarchical attribute indicting a hierarchical indentation of the data node during rendering, and a hidden status attribute indicating an expanding or collapsing status of the data node during presentation;

identifying data nodes to be presented from the at least two data nodes based on the sequential list, the attribute information of the at least two data nodes, page scrolling information and page size information of the information presentation page;

presenting node information list corresponding to the data nodes in the information presentation page, wherein the data nodes being presented are indented based on the corresponding hierarchical attributes, and data nodes belonging to different levels in the tree structure have different indentations, and wherein the node information list comprises at least one of a node information collapsing control or a node information expanding control; and in response to detecting an operation corresponding to a target node triggered for the node information collapsing control or the node information expanding control:

calculating a node quantity corresponding to the information presentation page after the operation of node information collapsing or node information expanding is performed;

determining a selected data node based on the target node and the node quantity; and updating the node information list of the information presentation page according to the selected data node.

2. The method according to claim 1, wherein the identifying the data nodes to be presented from the at least two data nodes based on the page scrolling information and the page size information of the information presentation page and the attribute information comprises:

calculating a node quantity of the data nodes during information presentation on the information presentation page according to the page size information of the information presentation page and the attribute information;

extracting, from the page scrolling information of the information presentation page, a page scrolling offset of the information presentation page during information presentation;

selecting a data node corresponding to the page scrolling offset in the at least two data nodes to obtain a reference data node; and identifying, with the reference data node as a benchmark, the data nodes to be presented from the at least two data nodes based on the attribute information and the node quantity.

3. The method according to claim 2, wherein the identifying, with the reference data node as a benchmark, the data node to be presented from the at least two data nodes based on the attribute information and the node quantity comprises:
  extracting, from the attribute information, node reference information of the data nodes and presentation information of the data nodes during information presentation, wherein the presentation information comprises a presentation size and a presentation state corresponding to the data node during information presentation; and
  determining, with the reference data node as the benchmark, the data nodes to be presented from the at least two data nodes based on the node quantity, the presentation size, and the presentation state.

4. The method according to claim 1, wherein the presenting the node information list corresponding to the data nodes in the information presentation page comprises:
  sorting the data nodes to be presented according to an association relationship between the data nodes to be presented; and
  generating the node information list for the data nodes to be presented based on the sorted data nodes.

5. The method according to claim 4, wherein:
  the operation corresponding to the target node is an information collapsing operation triggered for the node information collapsing control; the target node corresponding to the information collapsing operation is a first target node; and the method further comprises:
  in response to detecting the information collapsing operation, hiding node information corresponding to the first target node.

6. The method according to claim 4, wherein:
  the operation corresponding to the target node is an information expanding operation triggered for the node information expanding control; the target node corresponding to the information expanding operation is a second target node; and the method further comprises:
  in response to detecting the information expanding operation, expanding node information corresponding to the second target node.

7. An electronic device, comprising a memory, a processor, and a computer readable instruction stored on the memory and operable on the processor, the processor, when executing the computer readable instruction, implementing:
  receiving an information presentation request, the information presentation request carrying a resource identifier of an object to be presented and a page identifier during information presentation;
  displaying an information presentation page corresponding to the page identifier;
  obtaining a resource dataset of the object to be presented according to the resource identifier, the resource dataset comprising at least two data nodes and having a tree structure;
  flattening the resource dataset with the tree structure to obtain a sequential list and attribute information of each data node in the resource dataset, the attribute information of a data node comprising: a reference relationship attribute indicating a parent data node, a hierarchical attribute indicting a hierarchical indentation of the data node during rendering, and a hidden status attribute indicating an expanding or collapsing status of the data node during presentation;
  identifying data nodes to be presented from the at least two data nodes based on the sequential list, the attribute information of the at least two data nodes, page scrolling information and page size information of the information presentation page;
  presenting node information list corresponding to the data nodes in the information presentation page, wherein the data nodes being presented are indented based on the corresponding hierarchical attributes, and data nodes belonging to different levels in the tree structure have different indentations, and wherein the node information list comprises at least one of a node information collapsing control or a node information expanding control; and
  in response to detecting an operation corresponding to a target node triggered for the node information collapsing control or the node information expanding control:
    calculating a node quantity corresponding to the information presentation page after the operation of node information collapsing or node information expanding is performed;
    determining a selected data node based on the target node and the node quantity; and
    updating the node information list of the information presentation page according to the selected data node.

8. The electronic device according to claim 7, wherein the identifying the data nodes to be presented from the at least two data nodes based on the page scrolling information and the page size information of the information presentation page and the attribute information comprises;
  calculating a node quantity of the data nodes during information presentation on the information presentation page according to the page size information of the information presentation page and the attribute information;
  extracting, from the page scrolling information of the information presentation page, a page scrolling offset of the information presentation page during information presentation;
  selecting a data node corresponding to the page scrolling offset in the at least two data nodes to obtain a reference data node; and
  identifying, with the reference data node as a benchmark, the data nodes to be presented from the at least two data nodes based on the attribute information and the node quantity.

9. The electronic device according to claim 8, wherein the identifying, with the reference data node as a benchmark, the data nodes to be presented from the at least two data nodes based on the attribute information and the node quantity comprises:
  extracting, from the attribute information, node reference information of the data nodes and presentation information of the data nodes during information presentation, wherein the presentation information comprises a presentation size and a presentation state corresponding to the data node during information presentation; and
  determining, with the reference data node as the benchmark, the data node to be presented from the at least two data nodes based on the node quantity, the presentation size, and the presentation state.

10. The electronic device according to claim 7, wherein the presenting the node information list corresponding to the data nodes in the information presentation page comprises:
  sorting the data nodes to be presented according to an association relationship between the data nodes to be presented; and
  generating the node information list for the data nodes to be presented based on the sorted data nodes.

11. The electronic device according to claim 10, wherein:
the operation corresponding to the target node is an information collapsing operation triggered for the node information collapsing control; the target node corresponding to the information collapsing operation is a first target node; and the processor is further configured to implement:
in response to detecting the information collapsing operation, hiding node information corresponding to the first target node.

12. The electronic device according to claim 10, wherein t:
the operation corresponding to the target node is an information expanding operation triggered for the node information expanding control; the target node corresponding to the information expanding operation is a second target node; and the processor is further configured to implement:
in response to detecting the information expanding operation, expanding node information corresponding to the second target node.

13. A non-transitory computer readable storage medium, storing a computer readable instruction, the computer readable instruction, when executed by a processor, implementing:
receiving an information presentation request, the information presentation request carrying a resource identifier of an object to be presented and a page identifier during information presentation;
displaying an information presentation page corresponding to the page identifier;
obtaining a resource dataset of the object to be presented according to the resource identifier, the resource dataset comprising at least two data nodes and having a tree structure;
flattening the resource dataset with the tree structure to obtain a sequential list and attribute information of each data node in the resource dataset, the attribute information of a data node comprising: a reference relationship attribute indicating a parent data node, a hierarchical attribute indicting a hierarchical indentation of the data node during rendering, and a hidden status attribute indicating an expanding or collapsing status of the data node during presentation;
identifying data nodes to be presented from the at least two data nodes based on the sequential list, the attribute information of the at least two data nodes, page scrolling information and page size information of the information presentation page;
presenting node information list corresponding to the data nodes in the information presentation page, wherein the data nodes being presented are indented based on the corresponding hierarchical attributes, and data nodes belonging to different levels in the tree structure have different indentations, and wherein the node information list comprises at least one of a node information collapsing control or a node information expanding control; and
in response to detecting an operation corresponding to a target node triggered for the node information collapsing control or the node information expanding control:
calculating a node quantity corresponding to the information presentation page after the operation of node information collapsing or node information expanding is performed;
determining a selected data node based on the target node and the node quantity; and
updating the node information list of the information presentation page according to the selected data node.

14. The computer readable storage medium according to claim 13, wherein the identifying the data nodes to be presented from the at least two data nodes based on the page scrolling information and the page size information of the information presentation page and the attribute information comprises;
calculating a node quantity of the data nodes during information presentation on the information presentation page according to the page size information of the information presentation page and the attribute information;
extracting, from the page scrolling information of the information presentation page, a page scrolling offset of the information presentation page during information presentation;
selecting a data node corresponding to the page scrolling offset in the at least two data nodes to obtain a reference data node; and
identifying, with the reference data node as a benchmark, the data nodes to be presented from the at least two data nodes based on the attribute information and the node quantity.

15. The computer readable storage medium according to claim 14, wherein the identifying, with the reference data node as a benchmark, the data node to be presented from the at least two data nodes based on the attribute information and the node quantity comprises:
extracting, from the attribute information, node reference information of the data nodes and presentation information of the data nodes during information presentation, wherein the presentation information comprises a presentation size and a presentation state corresponding to the data node during information presentation; and
determining, with the reference data node as the benchmark, the data node to be presented from the at least two data nodes based on the node quantity, the presentation size, and the presentation state.

16. The method according to claim 1, wherein the attribute information of the data node further comprises a presentation height of the data node during rendering.

17. The method according to claim 16, wherein identifying the data nodes to be presented further comprises:
determining a height of the information presentation page; and
determining a maximum number of data nodes to be presented based on the height of the information presentation page, the height of the presentation height of the data node, and a distance between adjacent data nodes.

* * * * *